July 8, 1969 P. F. AL MARACHY 3,453,941
APPARATUS FOR DETERMINING THE BLOOD GROUP OF A SPECIMEN
Filed March 7, 1966 Sheet 4 of 4

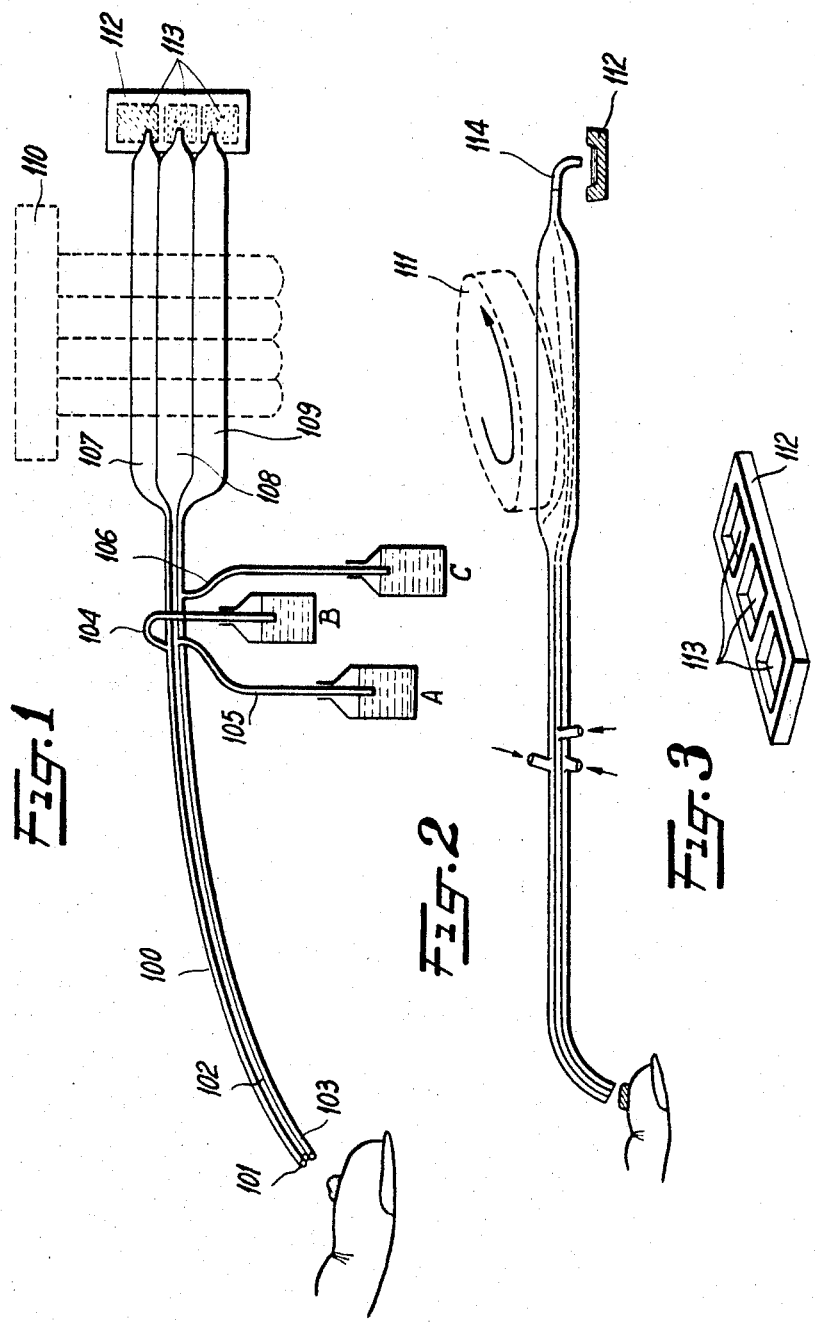

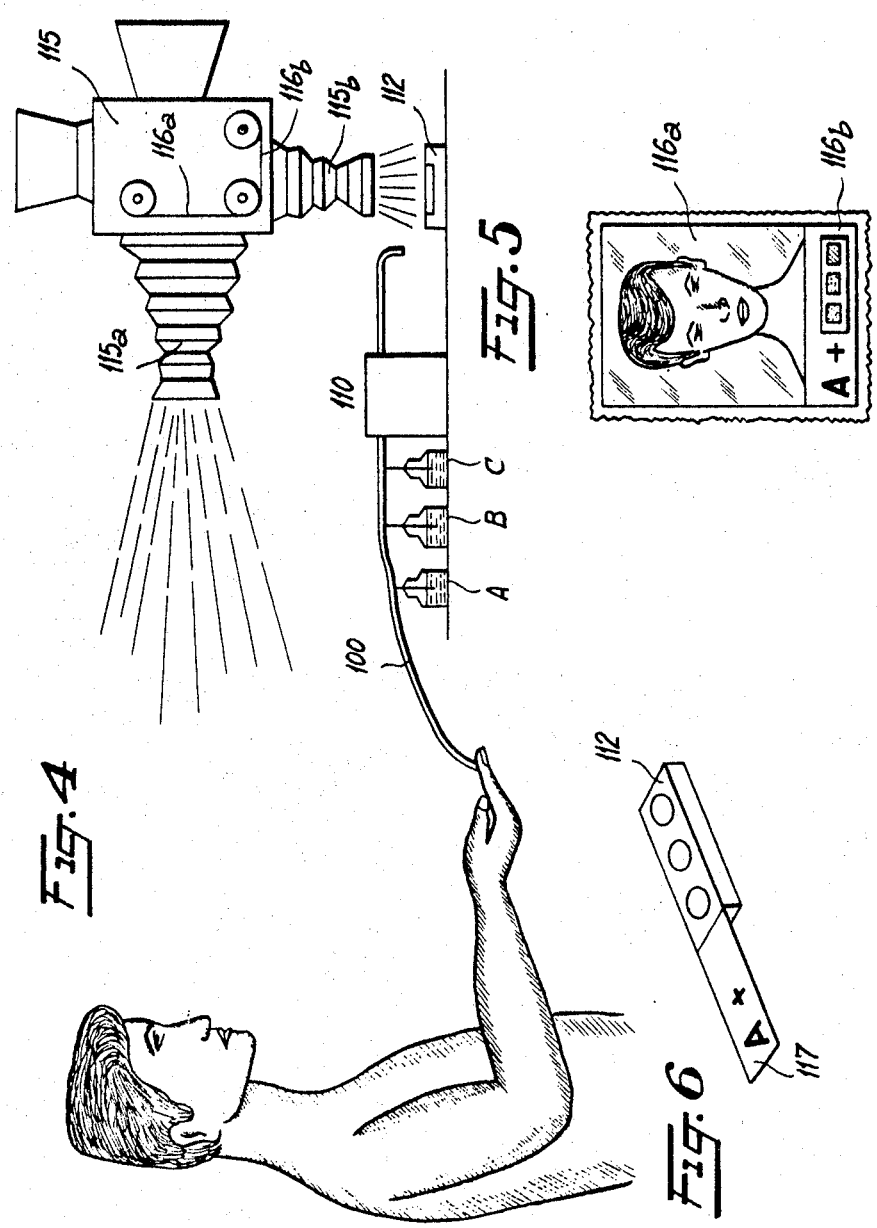

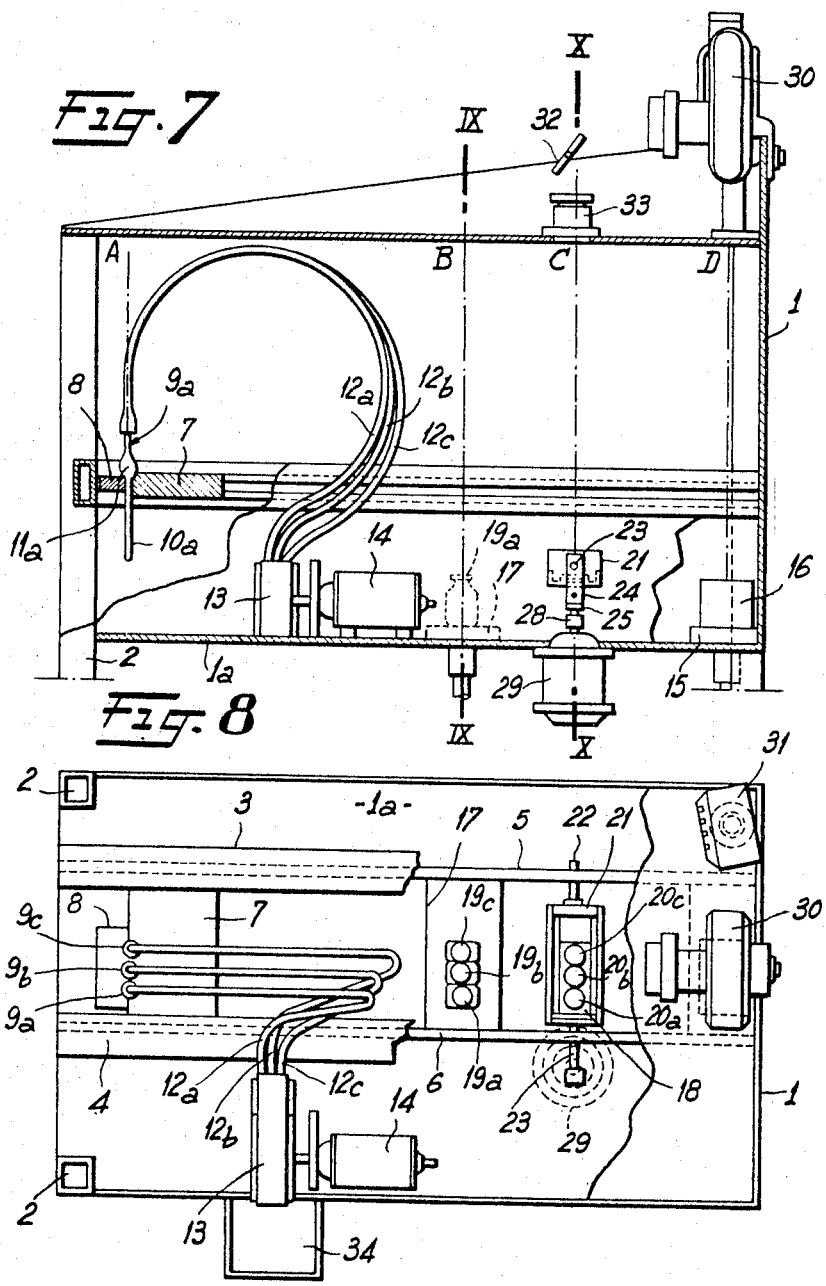

United States Patent Office 3,453,941
Patented July 8, 1969

3,453,941
APPARATUS FOR DETERMINING THE BLOOD GROUP OF A SPECIMEN
Pierre F. Al Marachy, Paris, France, assignor to S.I.P.S. Societe pour l'Identification Photographique du Groupe Sanguin, Paris, France, a corporation of France
Filed Mar. 7, 1966, Ser. No. 532,323
Claims priority, application France, Mar. 6, 1965, 8,242
Int. Cl. G03b 17/24
U.S. Cl. 95—1.1               9 Claims

ABSTRACT OF THE DISCLOSURE

An apparatus for determining the blood group of a donor and positively identifying the sample and donor comprising means for drawing a blood sample, means for depositing the blood sample together with a reagent in a series of adjacent receptacles formed in a plate, and photographic means for photographing the donor and plate on contiguous portions of a single film.

---

The classical methods for the determination of the blood group present in sample require numerous manipulations and give rise to mistakes being made.

According to the present invention there is provided an apparatus for determining the blood group of a specimen, such apparatus comprising means for consecutively taking a sample of the blood, mixing it with test serum and distributing the mixture on a reading-off device.

The apparatus may include a plurality of tubes, a branch tube connected to each such tube, a serum bottle connected to each branch tube, a dish for collecting a mixture of blood and serum from each tube and pump means effective to draw a portion of the blood sample along each tube and a serum from each bottle along each branch tube and inject the resulting mixture into a separate dish.

Alternatively, according to a preferred embodiment, the apparatus comprises a plate having cells in each of which a reaction between the blood and the test serum can take place, means for sampling the blood from a person positioned at a sampling point near the apparatus, means for mixing this blood with a test serum and placing the mixture in one of the cells, and a camera placed so as to photograph the face of the person and the plate of cells, on to two contiguous strips of one and the same film.

In order that the invention may more readily be understood, the following description is given, merely by way of example, with reference to the accompanying drawings in which:

FIGURE 1 is a schematic view of an apparatus showing the sampling of the blood and its distribution on to the plate of an agglutinoscope;

FIGURE 2 shows, again schematically, a device operated with the aid of a pump;

FIGURE 3 shows a viewing plate;

FIGURE 4 is a schematic view of the apparatus incorporating a camera;

FIGURE 5 represents the protograph obtained with the camera of FIGURE 4;

FIGURE 6 represents a viewing plate with a marking label for the blood group;

FIGURE 7 is a front elevation view of a more complete apparatus constructed according to the invention;

FIGURE 8 is a plan view of the apparatus of FIGURE 7;

Figure 9:
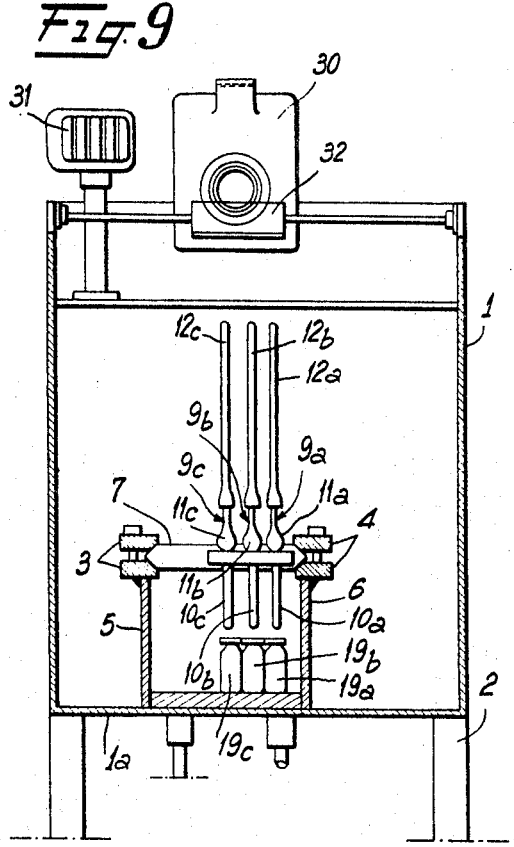
FIGURE 9 is a transverse section on the line IX—IX of FIGURE 7.
Figure 11:
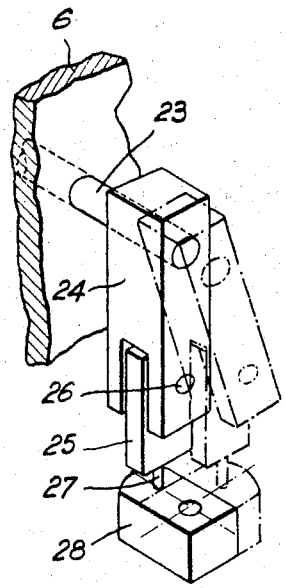
FIGURE 11 shows, in perspective, a detail of the device which drives the movement of the plate which receives the mixtures of blood and test serum.

As shown in FIGURE 1 the apparatus comprises a tube 100 consisting of three hollow primary tubes 101, 102 and 103; these tubes branch off into secondary tubes 104, 105 and 106, respectively.

Each of these secondary tubes dips into a flask such as A, B or C containing test serums (anti-A, anti-B, rhesus, etc.).

Beyond the junction of the secondary tubes with the primary tubes, the primary tubes slowly widen out so as to avoid, in view of their small diameter at the end where the drop of blood is sampled, any obstruction of the interior of the tube such as an obstruction due to the commencement of agglutination. A suitable pump is positioned at the point where the tubes widen out and where the mixing takes place (tubes 107, 108 and 109, so as to allow the blood mixed with the serums to pass towards the outlets; this pump may for example be a peristaltic pump of the finger type 110, as shown in FIGURE 1, or of the drum type 111, as shown in FIGURE 2, or any other type of pump.

Movement of the drum, or movement of the fingers of a peristaltic pump causes the blood to be drawn in, to be mixed at the top of the tubes 107, 108 and 109, and to be distributed through the orifices of each of these tubes on to a viewing plate 112, of the type shown in FIGURE 3, where the blood mixed with the test serums (anti-A, anti-B, rhesus etc.) is deposited. The laboratory worker only has to examine the plate 112 and the blood group of the patient is established in a precise manner, without risk of mistakes, from the reaction of the blood and the serum in the cells 113 of this plate.

After carrying out this operation it is necessary to clean the apparatus so as to avoid blood remaining in the assembly of tubes, when the blood group of another patient is subsequently determined. In other to do this, the end of the three tubes is dipped into an isotonic and anti-coagulant serum, in such a way that their internal surfaces are freed from any trace of the blood previously tested.

In order to speed up the reaction of the blood and the test serums, the plate 112 is subjected to gentle movement which assists mixing. A dripping spout 114 may be provided above each of the cells 113 of the plate.

A device may be provided on each of the dripping spouts in order to allow the plate 112 to be disconnected, for example avoiding the anticoagulant product which has been used for cleaning falling into the cells 113.

Reference is now made to FIGURES 4 to 6, in which the parts already shown in FIGURES 1 and 3 are given the same reference numerals. The apparatus furthermore comprises a photographic camera 115 having two objectives 115a, 115b, one of which is directed towards the patient and the other towards the plate 112. When the blood and the serum have reacted in the cells of this plate, the patient is photographed by means of the objective 115a his face being recorded on a part 116a of the film. The latter is then moved so that the plate 112 may be photographed by means of objective 115b on to a strip 116b of the film, contiguous to the strip 116a, as shown in FIGURE 5. This avoids any risk of error in transcription.

It is, of course, necessary to provide a camera having means for taking two juxtaposed pictures.

In another embodiment, a standard apparatus is used. In that case it is necessary to mask the lower part of the sensitized film and then the apparatus is tilted in such a way that the objective is positioned above the plate 112, the image falling on the previously masked part of the film.

At that point, the mask which hid a part of the film is lifted and replaced by a second mask which hides the surface of the film which had previously been exposed when the portrait was taken. The operator again trips the apparatus, which photographs the plate 112 where the blood group has been determined. The operator has previously taken care to place a marking plate 117 alongside the plate 112, the result of the reaction, for example A+, being inscribed on the marking plate (FIGURE 6).

As a result of this, if a mistake has been made in placing the marking plate 117, it is always possible to check the result of the reaction on the adjacent photograph of the plate through the agglutinoscope, and this allows subsequent transfusions to be carried out under the best possible conditions of safety.

As shown in FIGURE 5, the picture of the marking plate 177 is placed along side that of the plate 112, on the strip of film 116b. Thus the photograph, after being developed, carries all the principal information for the user in case of accident, and may for example be fixed to the identity card so as to immediately give the requisite information for a transfusion.

The apparatus shown schematically in FIGURES 7 to 11 comprises a chassis 1 in the approximate shape of an elongated box open at one end (the left end in FIGURES 7 and 8) and resting on legs 2; longitudinal parallel tracks 3 and 4 are carried in this box, at a level above the bottom, which is close to chest height for a person seated in front of the open end, the tracks being supported on uprights 5, 6 provided on the bottom 1a of the chassis. These form a guide track for a carriage 7 provided with a board 8 having openings for arranging three pipettes side-by-side.

Each pipette 9a, 9b or 9c comprises a lower portion consisting of a capillary tube 10a, 10b or 10c, open at the bottom, and an upper portion 11a, 11b or 11c, in the form of a hollow sphere. The latter is connected by means of flexible tubes 12a, 12b or 12c to a suction and pressure pump 13, preferably a peristaltic pump, the drive motor of which is shown at 14. In the pump, the tubes 12a, 12b and 12c are arranged side-by-side in a known manner on a table where the fingers driven by the motor 14 squeeze then one after another, as would successively be done by the index finger, middle finger, ring finger and little finger of a hand pressed down flat with the fingers initially raised. The tubes are of sufficient length between the pump and the pipettes for the carriage 7 to be able to move them from one end of the chassis 1 to the other without any difficulty.

FIGURES 7 and 8 show the pipettes at one end of the chassis, at the position A for sampling the blood. At the other end, the chassis carries a platform 15 which may be raised and lowered by a motor-operated device (not shown). This platform carries a tank 16 containing a wash liquid such as physiological serum. The movement of the platform is such that when it is in the raised position and if the pipettes have been brought vertically above it, they dip into the tank and can thus draw wash liquid from it. This position is position D.

In positions B and C which are intermediate between the wash position and the blood sampling position, the carriage 1 carries a platform 17 analogous to platform 15, (position B), and a small plate 18 (position C). The platform 17, which may be raised and lowered, carries bottles 19a, 19b and 19c which contain test serum, for example serums anti-A, anti-B and anti-D, respectively, the axes of the necks of the bottles being at the same distance apart as the axes of the pipettes. There the movement of the platform is such that when brought vertically above the bottles, the pipettes are in a position to withdraw serum from them when the platform is in the raised position.

Figure 10:
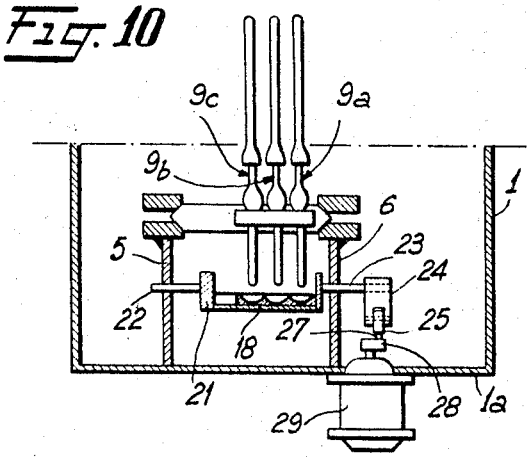
FIGURE 10 is a part section on the line X—X of FIGURE 7.

The small plate 18 has three cells 20a, 20b, 20c in its upper face, at the same spacing as the pipettes, and the plate is carried by a cradle 21 equipped with axles 22, 23 which can slide, axially in the apertures in supports 5, 6 (FIGURE 10). The axle 23 fits into a block 24 which is connected to another block 25 by a pivot 26, parallel to this axle. The block 25 is fitted on to a mandrel 27, in such a way that it can rotate, the mandrel being mounted eccentrically on a rotating platform 28 driven by a motor 29. The broken and continuous lines, indicate the movements which take place and it is thus seen that the cradle can simultaneously oscillate about the axis of the axles and move from side to side along this axis.

The chassis 1 carries a photographic apparatus 30, a flashlight 31, a reflector 32 (prism or semitransparent mirror) so arranged as to direct into the objective of the apparatus 30 rays coming from the cell part of plate 18, and an optical device 33 which compensates for the difference in the distances between the photographic apparatus and the person positioned at the point of blood sampling on the one hand and between this apparatus and the plate 18 on the other hand. Finally the chassis 1 carries, on the side of the pump 13, a trough 34 for receiving the liquid which has been used for washing the pipettes.

The apparatus is used in the following manner.

It is assumed that the pipettes 9a, 9b, 9c have just been washed at position D. The carriage 7 is moved to position B, vertically above the bottles 19a, 19b and 19c. The platform 17 is raised, for example by the carriage 7, on reaching B, closing a contact which supplies the control motor of this platform. The lower end of each pipette is then in one of the flasks. The pump 13 is then started and since it is volumetric, it allows an exactly defined volume to be drawn up by the end of an operating period which may be selected beforehand. Thus for example one drop of each of the serums will pass into the pipettes. The platform 17 is then lowered; for example, when one stops pump 13 this electrically causes the lowering. The carriage is then moved to position A.

The pump 13 is again started up so as to pump. The subject, seated in front of the open end of chassis 1, for example presents one of his fingers, pricked beforehand, to each of the ends of the pipettes in turn, so that a little blood is sampled. The pump 13 is kept running for a few moments in order to premit a suitable mixture of serum and blood to pass into each of the spherical sections 11a, 11b and 11c where it remains since the volume of each sphere is sufficiently large relative to the volume of the mixture for it not to be possible to pass beyond the sphere into the pump. Mixing is assisted by the aspiration of air, the bubbles of which burst on rising through the liquid and cause stirring in the spherical portion.

The carriage is next moved to point C. The pump, which had been stopped, is restarted but in the opposite sense, so as to force each mixture into the corresponding cup 20a, 20b or 20c. The motor 29 is then started in order to impart a rocking movement combined with an axial reciprocating movement to the plate 18, and the carriage is moved on to position D.

When sufficient time has elapsed for a reaction to have taken place in one of the cups 20a, 20b or 20c, the motor 29 is stopped and after the necessary adjustments for taking a photograph have been carried out, where appropriate, the apparatus 30 is triggered so that one should produce, side-by-side on the same film, a picture of the face of the person who has given the blood, and a picture of the three cups.

At position D, the platform 15 is raised so that the three pipettes dip into the wash liquid, preferably physiological serum, which is contained in tank 16, and the pump 13 is started. It is advantageous to choose a two-speed motor 14 so that at this stage the pump may be run at a higher rate, for example at twice the previous rate. The wash liquid which has rinsed the pipettes is thrown away into tank 34. The pump 13 is then stopped and the apparatus is ready for a new sequence of operations.

The apparatus may be electrically equipped in such a way that the various operations described above take place automatically under the control of a programmer.

I claim:
1. An apparatus for determining the blood group of a donor, said apparatus comprising means for collecting a sample of blood, container means having reagents therein, means for mixing the blood sample with said reagents, a plate having a plurality of receptacles therein to receive said mixture, means to deposit said mixture in said receptacles, a frame, means mounted on said frame for carrying said reagent containers and said plate, and photographic camera means adopted to substantially simultaneously photograph the donor's face and the mixture in said receptacles via two separate optical paths on adjacent record areas of a single film.

2. An apparatus according to claim 1 further comprising track means mounted on said frame, mobile carriage means movable along said track between a reagent receiving point adjacent said containers, a blood sampling point, and a point where said mixture is deposited on said plate, said collecting means comprising a plurality of pipettes mounted on said carriage, pump means operatively connected to aspirate and pressurize said pipettes to draw in said blood sample and reagent and deposit the mixture thereof in said receptacles.

3. An apparatus according to claim 2 wherein each said pipette consists of a tube of small diameter flaring into a wide section.

4. An apparatus according to claim 2 wherein said pipettes are mounted in a row on said carriage, whereby said donor presents his previously pricked finger to each tube mouth in succession.

5. An apparatus according to claim 2 wherein said means carrying said reagent containers further comprises means to selectively raise and lower the containers so that the ends of said pipettes can reach the reagent contained therein.

6. An apparatus according to claim 2 further comprising means to agitate said plate after receiving said mixture.

7. An apparatus according to claim 2 further comprising trough means containing a wash liquid therein, means to selectively raise and lower said trough so that the ends of said pipettes can reach the liquid therein, and means to receive the used wash liquid.

8. An apparatus according to claim 1 wherein said photographic camera means comprises at least two objective lenses one of which is directed towards the donor's face and the other of which is directed towards said plate.

9. An apparatus according to claim 1 wherein said photographic camera means comprises a single objective lens and means to reflect the image of one of the objects to be photographed, namely the donor and the plate, onto the film while the other said object is photographed directly.

References Cited

UNITED STATES PATENTS

| | | |
|---|---|---|
| 2,725,782 | 12/1955 | Worley. |
| 2,830,512 | 4/1958 | Nagel _____ 95—1.1 |
| 3,147,081 | 9/1964 | Stevenson _____ 23—230 |

JOHN M. HORAN, *Primary Examiner.*

U.S. Cl. X.R.

23—230, 253

UNITED STATES PATENT OFFICE
CERTIFICATE OF CORRECTION

Patent No. 3,453,941   Dated July 8, 1969

Inventor(s) Pierre F. AL MARACHY

It is certified that error appears in the above-identified patent and that said Letters Patent are hereby corrected as shown below:

In the caption, with respect to the right of priority, the following French applications are added;

France - March 6, 1965 - No. 8243

France - February 28, 1966 - No. 51 388

Signed and sealed this 24th day of April 1973.

(SEAL)
Attest:

EDWARD M. FLETCHER, JR.
Attesting Officer

ROBERT GOTTSCHALK
Commissioner of Patents